United States Patent [19]

Laviolette

[11] Patent Number: 4,952,424
[45] Date of Patent: Aug. 28, 1990

[54] METHOD FOR REPAIRING LEAKING FUEL TANKS

[76] Inventor: Arthur R. Laviolette, 4444 Trapani Ln., Swartz Creek, Mich. 48473

[21] Appl. No.: 49,378

[22] Filed: May 14, 1987

[51] Int. Cl.$^5$ .......................... B32B 35/00; B05D 7/22
[52] U.S. Cl. ..................................... 427/142; 427/237; 427/388.2
[58] Field of Search ....................... 427/239, 142, 388.2

[56] References Cited

U.S. PATENT DOCUMENTS

| | | | |
|---|---|---|---|
| 832,288 | 10/1906 | Benney | 427/239 |
| 2,877,922 | 3/1959 | DeCristoforo | 427/239 |
| 2,881,091 | 4/1959 | Schulze | 427/239 |
| 3,186,860 | 6/1965 | Jones | 427/239 |
| 4,022,935 | 5/1977 | Kinney et al. | 427/142 |
| 4,082,830 | 4/1978 | Cogliano | 427/154 |
| 4,544,172 | 11/1985 | Harrison | 427/142 |

FOREIGN PATENT DOCUMENTS

| | | | |
|---|---|---|---|
| 561694 | 8/1958 | Canada | 427/239 |
| 752332 | 2/1967 | Canada | 427/239 |
| 0028820 | 3/1981 | Japan | 427/239 |
| 6102973 | 8/1981 | Japan | 427/239 |
| 940445 | 10/1963 | United Kingdom | 427/239 |
| 1285034 | 8/1972 | United Kingdom | 427/239 |

*Primary Examiner*—Janyce Bell
*Attorney, Agent, or Firm*—Gifford, Groh, Sheridan, Sprinkle and Dolgorukov

[57] ABSTRACT

A process for repair of leaking fuel tanks containing gasoline, diesel fuel, and benzene ethyl alcohol mixtures has been incorporated which makes it economically feasible for repair of all fuel tanks made of metal. The process includes prepairing the fuel tanks by steam cleaning, sand blasting, applying liquid polyvinyl chloride and special curing process. This process completely envelopes the fuel tank in a plastic cover which adheres to the metal of the tank and seals off any fuel leaks.

6 Claims, 3 Drawing Sheets

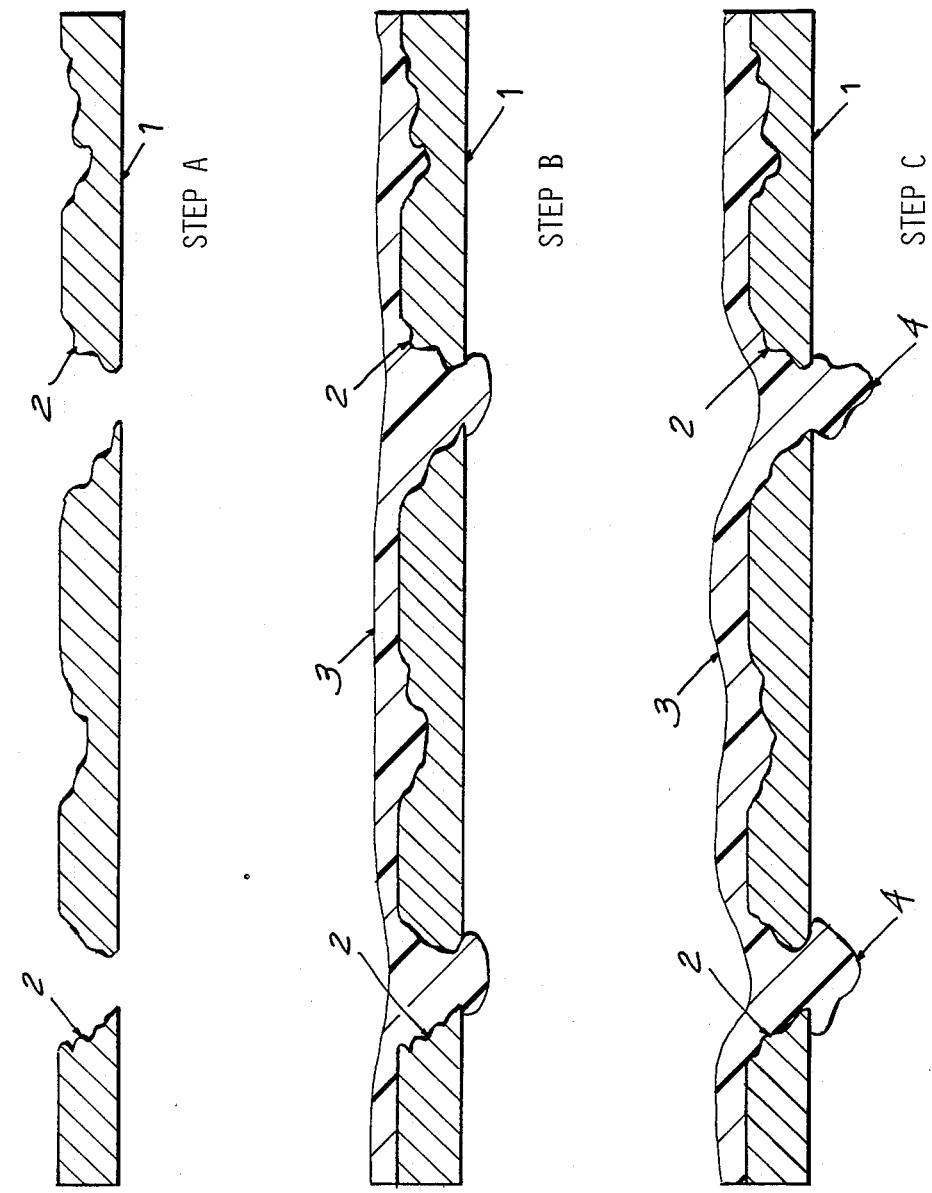

METHOD FOR REPAIRING LEAKING FUEL TANKS

BACKGROUND OF THE INVENTION

This invention pertains to a method for repairing fuel tanks, and more particularly to fuel tank repair by using polyvinyl chloride to repair leaking fuel tanks.

Many older model automobiles and trucks presently in service today have leaking fuel tanks due to corrosion, wear, accidents, or punctures. These leaking tanks are replaced with new tanks, used tanks, or repaired by welding, soldering, epoxy, tar, screws, or fiberglass. Often because of the fuel tanks age, the tank must be repaired because a new tank is no longer available. The repair methods are at best temporary as new leaks appear or old leaks start up again. This new process is directed to a system using liquid polyvinyl chloride to repair leaking fuel tanks.

SUMMARY OF THE INVENTION

Fuel tanks leak due to corrosion, wear, punctures, or faulty construction. Presently, fuel tanks are repaired by welding, soldering, or gluing the local spot that appears to be leaking. This type of repair is only temporary at best because the tank will often start leaking at the old leak or in a different location.

The present invention solves this problem by using a method that coats the entire inside and outside of the fuel tank with a liquid polyvinyl chloride and then cures the polyvinyl chloride by a method which forms a durable coating which prevents new leaks from developing.

The polyvinyl chloride is non flammable and compatible with gasoline, diesel, water, high octane fuel, methane, alcohol.

It is an object of this invention to provide a method for applying polyvinyl chloride to a fuel tank to seal existing leaks and prevent new leaks from developing.

It is an object of this invention to use a method which has a quick turn around time and be low cost.

It is a further object of this invention to use a method which will protect fuel tanks from corrosion and also be compatible with the fuel in the tank.

BRIEF DESCRIPTION OF THE DRAWING

FIG. 3 is a cross section of a fuel tank.

DESCRIPTION OF THE PREFERRED EMBODIMENTS

Figure 1:
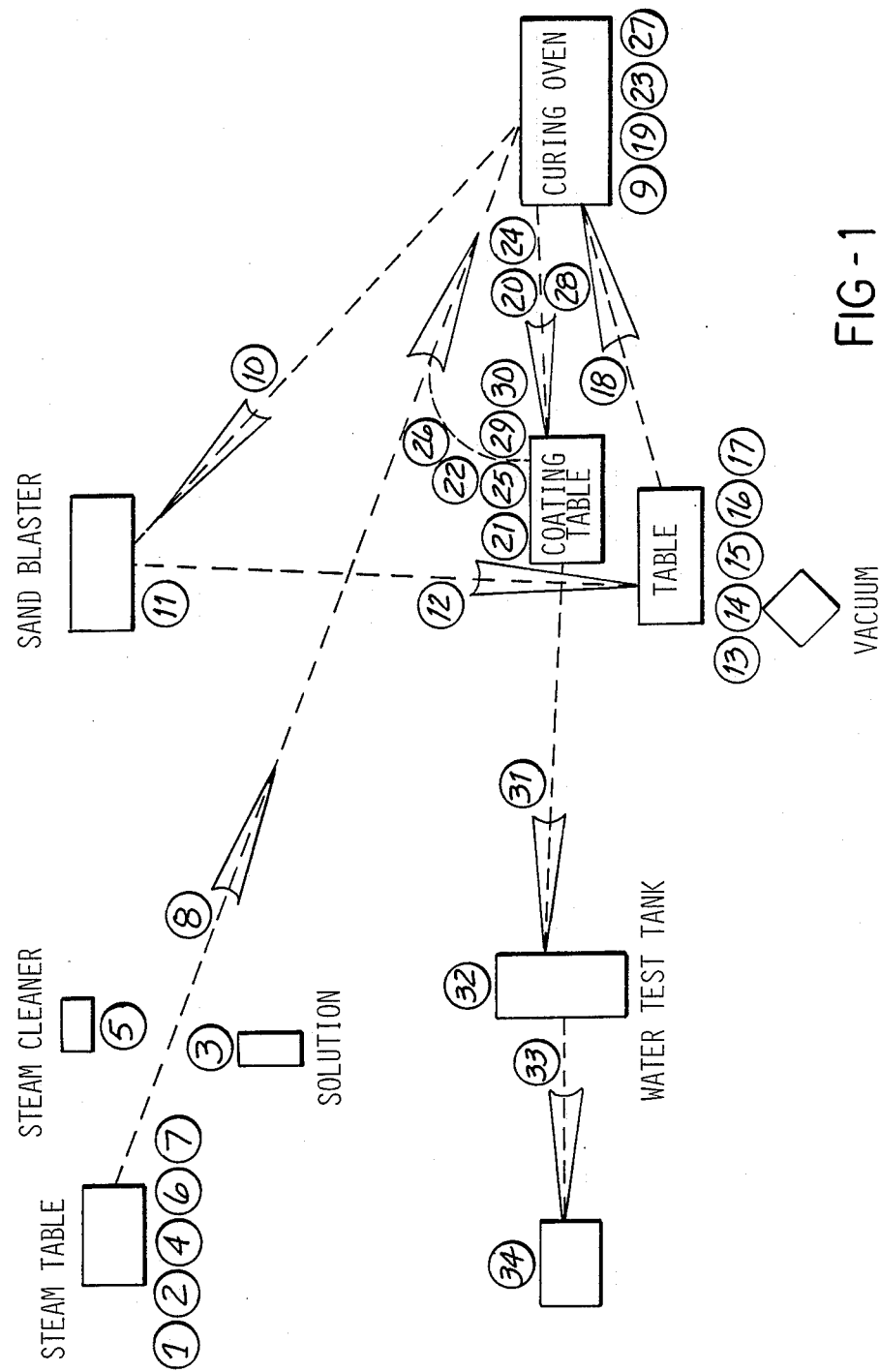
FIG. 1 is a Flow Chart.

Step 1: Remove sending unit and hoses from gas tank.

Step 2: Deposit cup of a continual cleaning solution mixture into tank. Thoroughly steam clean the gas tank inside and out making sure the steam and cleaning solution mixture removes all gas fumes from the tank. Empty tank.

Step 3: Completely sand blast the outer perimeters of the gas tank until bare metal is exposed.

Step 4: Take an air hose and blow the gas tank completely free of all particles left by the sand blast operation.

Step 5: Apply a PVC Plastic Adhesive liquid (PVC Formulation meeting Ozone resistance per Mil-F46736A passing 7 day test resistance to fuel and water, 180 degrees F. @ 24 hours, 25% ethyl alcohol, 75% benzene at room temperature @ 24 hours; diesel fuel #2 at room temperature @ 24 hours; 80% gasoline, 20% ethyl alcohol at 300 degrees F. @ 24 hours.) to the interior of the tank. The liquid PVC is poured into the tanks. The interior of the tank is then coated by turning the tank over from side to side and top to bottom to allow the liquid PVC to completely cover the inside of the tank. The tank is then placed in an oven and heated to 370° F. for six minutes to cure the liquid PVC.

In the preferred embodiment, the liquid polyvinyl chloride contains approximately 40% Aromatic Hydrocarbons, 1% Aliphatic Hydrocarbons, 30% PVC, 2% Stabilizers, 27% Calcium Carbonate, with a Specific Gravity of Approximately 1.4.

After coating the interior of the tank with the PVT, the liquid PVC is applied to top half of the gas tank and side seams. PVC plastic adhesive liquid (liquid polyvinyl chloride) is known in the art and available from Renosol of Ann Arbor, Mich., Croda Caourep Corp., of Union City, Mich., and Sternson Corp. of Ontario, Canada.

FIG. 3, Step A illustrates gas tank (1) and the edges (2) of a hole in a fuel tank. FIG. (3), Step B shows the PVC (3) applied to the tank.

Step 6: Place the tank in to curing oven. Heat to 370 degrees F. After heat reaches 370 degrees F. soak the gas tank at this temperature of r six minutes to ensure curing process is complete.

FIG. 3, Step C illustrates the PVC (3) applied to the tank and breakthrough (4) which acts as a sealing member.

Step 7: Remove gas tank from oven and repeat steps 5 and 6 to put a second coating on top of gas tank.

Step 8: Remove gas tank from oven and allow it to cool. Turn gas tank over and apply plastic adhesive to bottom of tank. Repeat step 6.

Step 9: Repeat steps 8 and 6 to apply second coating on bottom.

Step 10: Allow gas tank to cool and vacuum any foreign material from the inside of the tank.

Step 11: Place gas tank into water test tank and check for leaks.

Step 12: Install sending unit and hoses back into gas tank.

Figure 2:
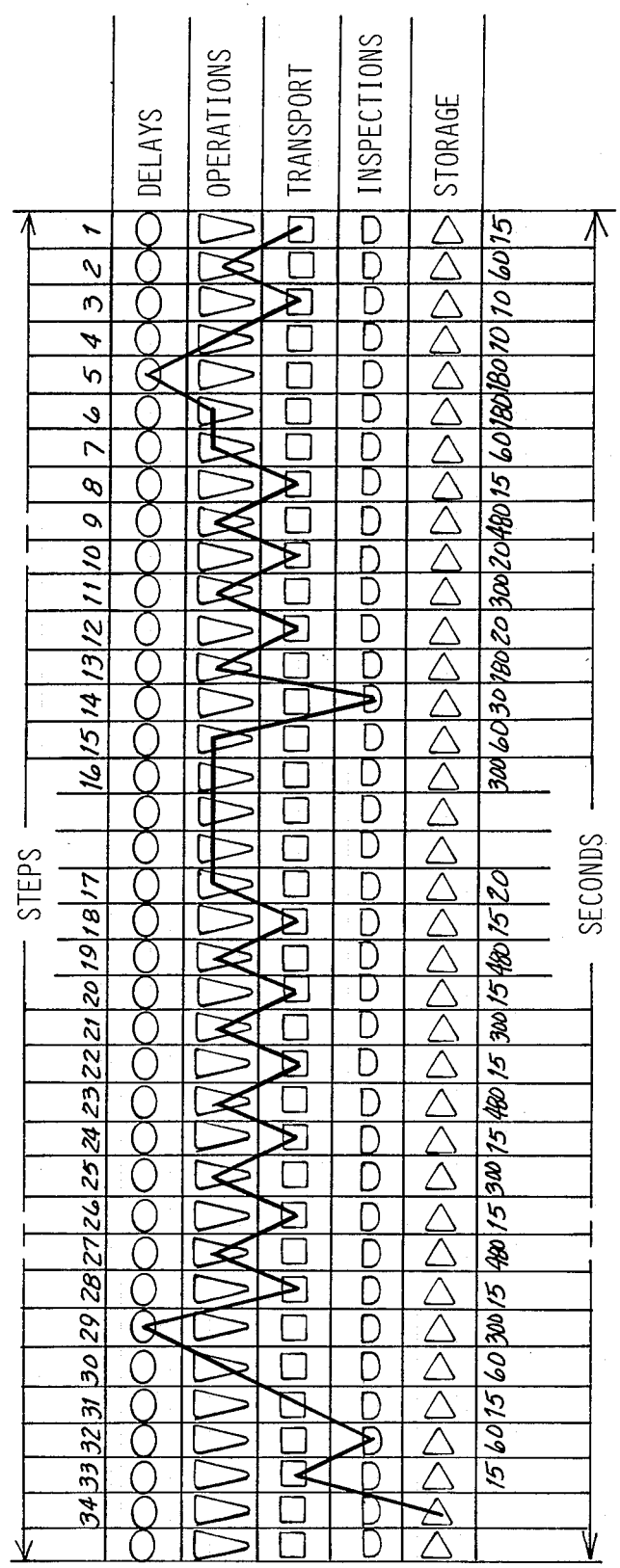
FIG. 2 is a Flow Chart method of details.

FIG. 1 is a flow chart and FIG. 2 lists details of the method as follows:

1. Place gas tank onto table.
2. Remove sending unit and hoses.
3. Get solution to wash tank.
4. Put solution into tank.
5. Turn steam cleaner on.
6. Steam clean tank.
7. Emply solution from tank.
8. Transport tank to oven.
9. Bake tank in oven.
10. Remove tank and transport to sandblaster.
11. Sand blast tank.
12. Transport tank to vacuum table.
13. Vacuum sand from inside tank.
14. Examine tank for holes.
15. Fill holes with PVC liquid.
16. Pour PVC liquid inside tank and coat by turning tank over from side to side and top to bottom allowing PVC to flow through-out.
17. Examine tank for complete coating inside.
18. Transport to oven.
19. Bake tank to cure PVC.
20. Remove tank and transport to coating table.

21. Apply PVC to bottom half of tank.
22. Transport tank to oven.
23. Bake tank to cure PVC.
24. Remove tank and transport to coating table.
25. Apply PVC to top half of tank.
26. Transport tank to oven.
27. Bake tank to cure PCV.
28. Remove tank and transport to table.
29. Allow tank to cool.
30. Install sending unit and plugs.
31. Transport to water tank for testing.
32. Water test tank for leaks @ 6-8 psi.
33. Transport to storage.
34. Store for customer.

Figure 4:
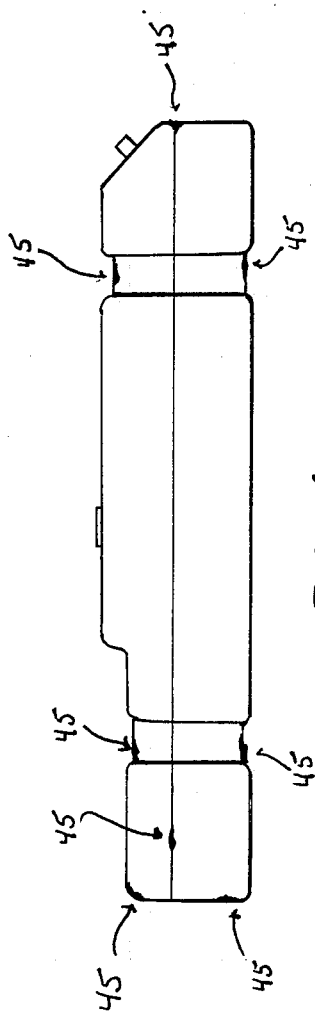
FIG. 4 is top and side view of a fuel tank.

FIG. 4 illustrates a problem fuel tank with typical corrosion areas.

I claim:

1. A method of repairing a low pressure vehicle fuel tank having holes which comprises the steps of:
   cleaning matter from the fuel tank that would prevent adhesion to polyvinyl chloride;
   filling the holes of the fuel tank by applying liquid polyvinyl chloride to the inside of the fuel tank;
   curing the liquid polyvinyl chloride at 370 degrees Farenheit for a minimum of six minutes;
   applying liquid polyvinyl chloride to the outside of the fuel tank; and
   curing the liquid polyvinyl chloride in an oven at 370 degrees for a minimum of 6 minutes so that the leaks of the tank are sealed.

2. A method repairing a low pressure vehicle fuel tank having holes which comprises the steps of:
   cleaning the interior of the tank with a cleaning solution to remove all gas fumes from the tank;
   steam cleaning the tank;
   sand blasting the outside of the tank until bare metal is exposed;
   filling the holes of the fuel tank by applying liquid polyvinyl chloride containing approximately 40% Aromatic Hydrocarbons, 1% Aliphatic Hydrocarbons, 30% PVC, 2% Stabilizers, 27% Calcium Carbonate, with a Specific Gravity of approximately 1.4 to the inside and outside of the fuel tank;
   curing the liquid polyvinyl chloride at 370 degrees Farenheit for a minimum of 6 minutes so that the leaks in the tank are sealed.

3. The method as defined by claim 1, which further comprises the
   applying liquid polyvinyl chloride containing approximately 40% Aromatic Hydrocarbons, 1% Aliphatic Hydrocarbons, 30% PCV, 2% Stabilizers, 27% Calcium Carbonate, with a Specific Gravity of approximately 1.4 to the top half of the tank and curing the liquid polyvinyl chloride on the top half of the tank;
   applying liquid polyvinyl chloride containing approximately 40% Aromatic Hydrocarbons, 1% Aliphatic Hydrocarbons, 30% PCV, 2% Stabilizers, 27% Calcium Carbonate, with a Specific Gravity of approximately 1.4 to the bottom half of the tank and curing the liquid polyvinyl chloride on the bottom half of the tank.

4. The method as defined by claim 2, which further comprises the steps of:
   applying liquid polyvinyl chloride containing approximately 40% Aromatic Hydrocarbons, 1% Aliphatic Hydrocarbons, 30% PCV, 2% Stabilizers, 27% Calcium Carbonate, with a Specific Gravity of approximately 1.4 to the top half of the tank and curing the liquid polyvinyl chloride on the top half of the tank;
   applying liquid polyvinyl chloride containing approximately 40% Aromatic Hydrocarbons, 1% Aliphatic Hydrocarbons, 30% PCV, 2% Stabilizers, 27% Calcium Carbonate, with a Specific Gravity of approximately 1.4 to the bottom half of the tank and curing the liquid polyvinyl chloride on the bottom half of the tank.

5. The method as defined by claim 1, which further comprises the steps of:
   applying a second coat of polyvinyl chloride containing approximately 40% Aromatic Hydrocarbons, 1% Aliphatic Hydrocarbons, 30% PCV, 2% Stabilizers, 27% Calcium Carbonate, with a Specific Gravity of approximately 1.4 to the inside and outside of the tank; and curing the second coat.

6. The method as defined claim 2, which further comprises the steps of:
   applying a second coat of polyvinyl chloride containing approximately 40% Aromatic Hydrocarbons, 1% Aliphatic Hydrocarbons, 30% PCV, 2% Stabilizers, 27% Calcium Carbonate, with a Specific Gravity of approximately 1.4 to the inside and outside of the tank.

* * * * *